United States Patent [19]

Coleman

[11] 3,959,224

[45] May 25, 1976

[54] WATER-SOLUBLE HYDROXYALKYLATED AND ALKOXYALKYLATED COMPOSITIONS AND THE LIKE DERIVED FROM N-3-OXOHYDROCARBON-SUBSTITUTED ACRYLAMIDES, AND POLYMERS THEREOF

[75] Inventor: Lester Earl Coleman, Willoughby Hills, Ohio

[73] Assignee: The Lubrizol Corporation, Wickliffe, Ohio

[22] Filed: Dec. 16, 1974

[21] Appl. No.: 533,361

Related U.S. Application Data

[63] Continuation-in-part of Ser. No. 111,676, Feb. 1, 1971, abandoned, which is a continuation-in-part of Ser. No. 833,162, June 13, 1969, abandoned, which is a continuation-in-part of Ser. No. 751,715, Aug. 12, 1968, abandoned.

[52] U.S. Cl.................. 260/63 R; 260/29.6 H; 260/29.6 AN; 260/29.7 W; 260/29.7 H; 260/42.21; 260/42.22; 260/42.43; 260/63 N; 260/64; 260/72 R; 260/561 N; 260/561 A; 260/561 K; 260/561 HL; 260/561 S; 260/561 B; 260/562 K; 260/562 P; 260/562 A; 526/79; 526/173

[51] Int. Cl.².................. C08F 20/58; C08F 20/70

[58] Field of Search.............. 260/72, 63 R, 63 N, 260/558, 561 N, 29.6, 64, 561 A, 561 K, 561 HL, 561 B, 562 R, 562 N, 562 B, 562 K, 562 P, 562 A, 561 S

[56] References Cited
UNITED STATES PATENTS

| | | | |
|---|---|---|---|
| 2,718,515 | 9/1955 | Thomas............................ | 260/80.5 |
| 3,249,651 | 5/1966 | Gaylord............................ | 260/834 |
| 3,277,056 | 10/1966 | Coleman............................ | 260/63 |
| 3,315,011 | 4/1967 | Baugh............................ | 260/834 |
| 3,341,455 | 9/1967 | Coleman............................ | 252/51.5 |
| 3,368,999 | 2/1968 | Sekmakas et al..................... | 260/72 |
| 3,425,942 | 2/1969 | Coleman............................ | 252/51.5 |
| 3,497,467 | 2/1970 | Coleman............................ | 260/29.6 |
| 3,518,326 | 6/1970 | Frosberg............................ | 260/828 |

*Primary Examiner*—Lester L. Lee
*Attorney, Agent, or Firm*—Millen, Raptes & White

[57] ABSTRACT

N-3-Oxohydrocarbon-substituted acrylamides, especially diacetone acrylamide, react with aldehydes in alkaline media (usually aqueous) to form water-soluble compositions which contain hydroxyalkylated and/or alkoxyalkylated derivatives of said substituted acrylamides. Addition polymers of these water-soluble compositions may be prepared, especially as aqueous latices or as solutions in organic solvents. These addition polymers are useful in adhesives and coatings. In particular, the polymers may be combined with pigments and/or with alkaline reagents or aminoplast compositions to form paints and textile adhesives.

21 Claims, No Drawings

WATER-SOLUBLE HYDROXYALKYLATED AND ALKOXYALKYLATED COMPOSITIONS AND THE LIKE DERIVED FROM N-3-OXOHYDROCARBON-SUBSTITUTED ACRYLAMIDES, AND POLYMERS THEREOF

This application is a continuation-in-part of copending application Ser. No. 111,676, filed Feb. 1, 1971, now abandoned, which is a continuation-in-part of application Ser. No. 833,162, filed June 13, 1969, now abandoned, which in turn is a continuation-in-part of application Ser. No. 751,715, filed Aug. 12, 1968, now abandoned.

INTRODUCTION AND SUMMARY

This invention relates to new water-soluble compositions of matter, to a method of making such compositions, and to thermosetting polymeric products derived therefrom. More particularly, it relates to water-soluble compositions prepared by reacting, in the presence of an alkaline reagent and under conditions which promote the formation of water-soluble condensation products, an aliphatic aldehyde containing not more than 4 carbon atoms, or a reversible polymer thereof, with an N-3-oxohydrocarbon-substituted acrylamide having the formula $$R^9-\underset{\underset{R^9}{|}}{\overset{\overset{R^9}{|}}{C}}-\overset{O}{\overset{\|}{C}}-\underset{\underset{R^9}{|}}{\overset{\overset{R^9}{|}}{C}}-\underset{\underset{R^7}{|}}{\overset{\overset{R^6}{|}}{C}}-NH\overset{O}{\overset{\|}{C}}-\underset{\underset{R^8}{|}}{C}=CH_2 \quad (I)$$

wherein each $R^9$ is individually hydrogen or a hydrocarbon or substituted hydrocarbon radical, at least one $R^9$ being hydrogen; each of $R^6$ and $R^7$ is hydrogen or a hydrocarbon or substituted hydrocarbon radical; and $R^8$ is hydrogen, halogen or a lower alkyl or substituted lower alkyl radical; said reaction being effected in a diluent comprising (1) water, or (2) an organic liquid which is a solvent for the reactants or the product or both, or (3) a mixture of diluents 1 and 2.

The term "hydrocarbon radical" as used herein includes aliphatic, cycloaliphatic and aromatic (including aliphatic- and cycloaliphatic-substituted aromatic and aromatic-substituted aliphatic and cycloaliphatic) radicals. It also includes cyclic radicals wherein the ring is completed through another portion of the molecule; that is, any two indicated substituents may together form a cycloalkyl radical.

The following are illustrative of hydrocarbon radicals within the scope of this invention. Where a named radical has several isomeric forms (e.g., butyl), all such forms are included.

| | |
|---|---|
| Methyl | Benzyl |
| Ethyl | Cyclohexyl |
| Propyl | Cyclopentyl |
| Butyl | Methylcyclopentyl |
| Hexyl | Cyclopentadienyl |
| Octyl | Vinylphenyl |
| Decyl | Isopropenylphenyl |
| Vinyl | Cinnamyl |
| Allyl | Naphthyl |
| Ethynyl | |
| Propargyl | |
| Phenyl | |
| Tolyl | |
| Xylyl | |
| $-C_6H_3(C_2H_5)_2$ | |
| $-C_6H_4(CH_2)_{11}CH_3$ | |

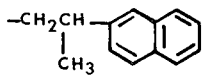

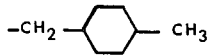

Many obvious variations of these radicals will be apparent to those skilled in the art and are included within the scope of the invention.

Substituted hydrocarbon, alkyl, aryl, etc., radicals are considered fully equivalent to the hydrocarbon, alkyl, aryl, etc., radicals and to be part of this invention. By "substituted" is meant radicals containing substituents which do not alter significantly the character or reactivity of the radical. Examples are:

Halide (fluoride, chloride, bromide, iodide)
Ether (especially lower alkoxy)
Keto
Carboxy
Ester (especially lower carbalkoxy)
Aminoacyl (amide)
Nitro
Cyano
Thioether
Sulfoxy
Sulfone In general, no more than about three such substituent groups will be present for each 10 carbon atoms in the radical.

Usually the hydrocarbon or substituted hydrocarbon radicals in the compositions of this invention are free from ethylenic and acetylenic unsaturation and have no more than about 30 carbon atoms, desirably no more than about 12 carbon atoms. They are preferably lower hydrocarbon radicals, the word "lower" denoting radicals containing up to seven carbon atoms. A particular preference is expressed for lower alkyl or aryl radicals, especially alkyl.

THE WATER-SOLUBLE COMPOSITIONS

For preparation of the especially preferred compositions of this invention, from one to three and preferably all five of the $R^9$ radicals in the N-3-oxohydrocarbon-substituted acrylamide reagent are hydrogen; $R^6$ and $R^7$ are lower alkyl radicals; and $R^8$ is hydrogen or methyl. Suitable N-3-oxohydrocarbon-substituted acrylamides are disclosed in U.S. Pat. Nos. 3,277,056 and 3,425,942, the disclosures of which are hereby incorporated by reference in this specification; examples are N-(1,1-dimethyl-3-oxobutyl) acrylamide, hereinafter referred to as diacetone acrylamide, and N-(1,3-diphenyl-1-methyl-3-oxopropyl) acrylamide, hereinafter referred to as diacetophenone acrylamide. Because diacetone acrylamide is preferred and is most readily available, it will frequently be referred to in this specification. However, it is to be understood that other N-3-oxohydrocarbon-substituted acrylamides may be substituted for diacetone acrylamide.

Aldehydes which may be reacted with diacetone acrylamide to form the water-soluble compositions of this invention include formaldehyde, acetaldehyde, propionaldehyde and the butyraldehydes. Of these, formaldehyde is preferred. Reversible polymers of the aldehydes (e.g., paraformaldehyde, trioxane, paraldehyde) may be used in place of the monomeric aldehydes and are considered equivalents thereof.

Alkaline reagents suitable for use include sodium hydroxide, potassium hydroxide, alkaline earth metal hydroxides, sodium methoxide, quaternary ammonium hydroxides and the like. The proportion of alkaline reagent used to promote the condensation is small and usually need not be greater than about 1.5 mole percent of the aldehyde used. To avoid the possibility of forming water-insoluble resins, the amount of alkaline reagent should, in general, not exceed about 5 mole percent of the aldehyde. While larger amounts may sometimes by employed, the use of such larger amounts is unnecessary and requires close control of the reaction (e.g., through use of an alcohol solvent or cautious incremental addition of the alkaline reagent, as described hereinafter) to avoid formation of a water-insoluble polymeric product as discussed hereinafter.

The reaction temperature is not critical, so long as it is not high enough to cause decomposition of the reactants or product or condensation to a water-insoluble product. Temperatures below about 100°C., preferably about 40°–90°C., are preferred. Likewise, the molar ratio of aldehyde to diacetone acrylamide is not critical. This ratio is usually at least 1:1 to reduce the proportion of unreacted substituted acrylamide in the product; e.g., between about 1:1 and 8:1, preferably between 1:1 and 4:1. In some instances the presence of a polymerization inhibitor such as hydroquinone, hydroquinone monomethyl ether or a hindered phenol may be beneficial.

As previously mentioned, the reaction is carried out in a diluent comprising (1) water, or (2) an organic liquid which is a solvent for the reactants or the product or both, or (3) a mixture of diluents 1 and 2. Suitable organic diluents include alcohols, especially lower alkanols such as methanol, ethanol, n-butanol, isobutanol and the like; ethers and ether alcohols such as di-n-butyl ether, ethylene glycol monomethyl ether, ethylene glycol dimethyl ether, diethylene glycol monomethyl ether, dioxane and the like; and aromatic hydrocarbons such as benzene, toluene and xylene. The lower alkanols are particularly preferred by reason of the fact that they serve as solvents for both the reactants and the products. The same is true of water, and in the particularly preferred embodiments of the invention, water alone is the diluent.

The water-soluble compositions of this invention are mixtures of chemical compounds which include dimers and trimers. Information about the structures of the constituents of these compositions has been obtained by various analytical procedures including elemental analysis, infrared and nuclear magnetic resonance spectroscopy, and gel permeation chromatography. These procedures, when applied to the condensation product of diacetone acrylamide with formaldehyde or paraformaldehyde, show that the principal constituents of the compositions of this invention are: (A) first, hydroxyalkyl compounds of the formula

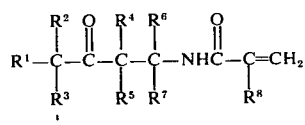
(II)

wherein each of $R^1$, $R^2$, $R^3$, $R^4$ and $R^5$ is hydrogen, a hydrocarbon or substituted hydrocarbon radical, or a hydroxyalkyl radical having not more than 4 carbon atoms, at least one and preferably from one to four of said radicals being hydroxyalkyl radicals and the remainder thereof preferably being hydrogen, and $R^6$, $R^7$ and $R^8$ are as previously defined, these hydroxyalkyl compounds being the predominant chemical species; and second, when an alcohol is used as a diluent, analogous compounds containing alkoxyalkyl (preferably alkoxyalkyl) radicals in place of one or more (usually one or two) of said hydroxyalkyl radicals; and (B) water-soluble condensation dimers and trimers of said compounds.

The condensation dimers and trimers comprising constituent B are self-condensation products of the type whose formation from compounds containing active methylol groups and ethers thereof is well known. For example, similar products are obtainable from phenolic alcohols prepared by the reaction of one mole of formaldehyde with one mole of phenol or the like, and from N-methylolacrylamide. These products contain alkylideneoxyalkylidene (e.g., methyleneoxymethylene) bridges, produced by elimination of the elements of water (1 mole) from two molecules, or alkylidene (e.g., methylene) bridges, produced by elimination of the elements of water and formaldehyde (one mole each). See, e.g., Martin, The Chemistry of Phenolic Resins (New York: John Wiley & Sons, Inc., 1956) pp. 59–61 and 62–63; Kamogawa et al., J. Polymer Sci., 50, 211, 216 (1961); and U.S. Pat. Nos. 3,037,963 and 3,079,434. The condensation dimers and trimers are formed by condensation through the hydroxyalkyl or alkoxyalkyl groups of constituent A; i.e., they consist of two and three molecules, respectively, of constituent A linked by self-condensation of their hydroxyalkyl or alkoxyalkyl groups as described in the above-noted Martin, Kamogawa et al. and patent references. Like constituent A, each unit of constituent B possesses a keto group and a polymerizable acrylamide group. Since they possess the latter group, they polymerize in the same way as constituent A to form polymers useful as desribed hereinafter.

In general, the water-soluble compositions of this invention consist essentially of the above-described compounds; that is, said compounds are the only ones present which materially affect or contribute to the novel properties of said compositions. The compositions may also sometimes contain small amounts of higher condensation oligomers.

It is usually found that the compositions of this invention also contain measurable amounts of diacetone acrylamide (or other compounds of formula I used as reactants), since it is difficult to force the hydroxyalkylation reaction to completion. The diacetone acrylamide may be present in amounts up to about 50% by weight of the water-soluble composition, but it generally comprises less than about 20% by weight thereof. The presence of diacetone acrylamide in the water-soluble compositions of this invention is not detrimental to their properties, but at the same time it does not appear to be beneficial since diacetone acrylamide merely functions as a diluent. Therefore, the percentage thereof is preferably kept as low as possible.

Likewise, the presence of alkoxy derivatives and condensation dimers and trimers, especially the latter, is not harmful for the puproses of this invention; in fact, such materials frequently improve the curing properties of the latices described hereinafter. However, if the reaction between diacetone acrylamide and the aldehyde is allowed to proceed too fast (especially in the presence of relatively large amounts of alkaline reagent, as mentioned hereinabove), condensation of the hydroxyalkyl compounds may get out of control and the product may contain substantial or major proportions of a water-insoluble thermosetting resin of the type disclosed and claimed in U.S. Pat. No. 3,518,326 and U.S. Pat. No. Re. 27,328. The disclosures in those patents of hydroxyalkyl compounds disclosed herein, and present in the water-soluble compositions claimed herein, were derived from me. Those applications also claim subject matter not claimed herein relating to the above-described thermosetting resins and the method for their preparation.

The reaction is conducted under conditions which promote the formation of water-soluble condensation products rather than water-insoluble resins. There are a number of ways to control the reaction so as to avoid formation of the water-insoluble resin. One is through the use of a small proportion of alkaline reagent. Another, discussed hereinabove, is to avoid excessively high reaction temperatures. Another is the use of an alcohol as solvent; apparently under such conditions the formation of alkoxyalkyl derivatives is favored and such derivatives undergo condensation less easily than the hydroxyalkyl compounds. Still another is incremental addition of the alkaline reagent over a prolonged period. When such incremental addition is employed, the pH of the mixture rises to about 10–11 after the addition of an increment of alkali but then gradually drops to about 7–8. It is believed that this is caused by a Cannizzaro-type reaction between excess alkali and excess formaldehyde to produce an alkali metal formate. Any one or more of the above ways can be and preferably is employed. Other conditions which promote the formation of water-soluble condensation products will be apparent to those skilled in the art.

The method described above produces a solution or suspension of the composition of this invention in water or an organic diluent, usually a solution in water or an alcohol. It is possible to isolate the composition by removal of the diluent, which should be done cautiously and at relatively low temperatures (e.g., by vacuum evaporation or spray drying) to avoid condensation to a water-insoluble product as previously described. In the same way, the composition may be concentrated by removal of a portion of the diluent, or a high-boiling diluent may be added and the lower-boiling one removed by evaporation.

The preparation of the water-soluble compositions of this invention is illustrated by the following examples. All parts and percentages are by weight unless otherwise indicated.

EXAMPLE 1

A solution of 338 parts (2 moles) of diacetone acrylamide in 1,000 parts of water is heated to 50°C. and 45 parts of a 3% aqueous solution of trisodium phosphate is added. Dropwise addition of a 37% aqueous solution of formaldehyde is then begun and is continued for one hour, a total of 650 grams (8 moles of formaldehyde) being added. During the formaldehyde addition, three further portions of trisodium phosphate solution, one of 14 parts and two of 15 parts, are added. Heating is continued for five hours after formaldehyde addition is complete, and during that time additional increments of trisodium phosphate solution are added, care being taken that the pH of the mixture never increases above 10, until a total of 299 parts have been introduced (0.16 mole, or 2.0 mole percent based on formaldehyde).

The solution is cooled and filtered, and volatile materials are removed by heating under vacuum at 55°C. The product is a 61% aqueous solution of the desired water-soluble composition.

EXAMPLE 2

Following the procedure of Example 1, a similar reaction product is prepared from diacetone acrylamide and acetaldehyde.

EXAMPLE 3

Following the procedure of Example 1, a similar reaction product is prepared from diacetone acrylamide and n-butyraldehyde.

EXAMPLE 4

A solution of 280 parts (1.66 moles) of diacetone acrylamide in 296 parts of distilled water is heated to 33°C., and 164 parts of paraformaldehyde (5 moles based on monomeric formaldehyde) is added over 20 minutes. The solution is then heated to 47°C. and 8.3 parts of a 10% aqueous solution of potassium hydroxide is added over 10 minutes. The reaction mixture is stirred and heated to 52°C. over about one-half hour, at which time an exothermic reaction begins; stirring is continued and the temperature is kept at about 50°C. by passing cooling water through a jacket on the reaction vessel. At the end of the two-hour stirring period, an additional 8.3 parts of the potassium hydroxide solution is added, and a final 8.3 parts is added after a further two-hour stirring period (total 0.9 mole percent based on formaldehyde). The mixture is stirred for an additional 2 hours, cooled to 24°C. and filtered. The product, a 55% aqueous solution of the desired water-soluble composition, contains 3.04% nitrogen.

EXAMPLE 5

To a solution of 644 parts (3.81 moles) of diacetone acrylamide in 681 parts of water, at 31°C., is added, with stirring, 372 parts of paraformaldehyde (11.3 moles based on monomeric formaldehyde). The mixture is heated to 43°C. and 19 parts of a 10% aqueous solution of potassium hydroxide is added. The mixture is further heated, with stirring, to 48°–55°C. and maintained at this temperature for two hours. An additional 19 parts of potassium hydroxide solution is then added and stirring is continued for 2 hours, followed by addition of a third 19-ml. portion of potassium hydroxide solution (total 0.87 mole percent based on formaldehyde) and stirring for 2 more hours. The solution is then cooled to 29°C., 0.044 part of methylhydroquinone is added and the mixture is filtered. The product, a 53% aqueous solution of the desired water-soluble composition, contains 3.04% nitrogen.

EXAMPLE 6

A portion of the product of Example 5 (1,500 parts) is heated at 50°–55°C./70 torr for 8½ hours, during which time 469 parts of water is removed by distillation. The product is an 80% aqueous solution of the desired water-soluble composition.

EXAMPLE 7

A mixture of 400 parts of the product of Example 5 and 220 parts of ethylene glycol monomethyl ether is heated at 58°–72°C./102 torr until 309 parts of volatile material has been removed by distillation. The residue is an approximately 71% solution of the desired water-soluble composition in ethylene glycol monomethyl ether.

EXAMPLE 8

A mixture of 1,352 parts (8 moles) of diacetone acrylamide, 1,136 parts of methanol and 480 parts of a solution comprising 55% formaldehyde (8.8 moles of formaldehyde), 35% methanol and 10% water is heated to 44°C., and 10 parts of a 10% solution of potassium hydroxide in methanol (0.2 mole percent of potassium hydroxide based on formaldehyde) is added. The mixture is heated at 44°–47°C. for 7 hours, with stirring, and is then stripped of volatile materials by distillation at 48°C./4 torr. The water-soluble product contains 7.08% nitrogen.

EXAMPLE 9

Following the procedure of Example 8, a water-soluble product containing 6.16% nitrogen is obtained from 1,014 parts (6 moles) of diacetone acrylamide, 1,706 parts of methanol, 491 parts (9.0 moles of formaldehyde) of formaldehyde-methanol-water solution, and 10 parts of methanolic potassium hydroxide (0.2 mole percent potassium hydroxide based on formaldehyde).

EXAMPLE 10

Following the procedure of Example 8, a water-soluble product containing 6.38% nitrogen is obtained from 1014 parts (6 moles) of diacetone acrylamide, 1,767 parts of methanol, 654 parts (12 moles of formaldehyde of formaldehyde-methanol-water solution, and 10 parts of methanolic potassium hydroxide (0.15 mole percent potassium hydroxide based on formaldehyde).

EXAMPLE 11

A mixture of 1014 parts (6 moles) of diacetone acrylamide, 1,890 parts of methanol, 981 parts (18 moles of formaldehyde) of formaldehyde-methanol-water solution of Example 8 and 10 parts of a 10% solution of potassium hydroxide in methanol is heated to 50°C., with stirring, for about three hours. An additional portion of 10 parts of methanolic potassium hydroxide is added and heating and stirring are continued for four hours. A third portion of methanolic potassium hydroxide is then added (total 0.3 mole percent potassium hydroxide based on formaldehyde). Heating and stirring are continued for four hours, and then the solution is cooled and stripped of volatile materials by vacuum distillation as in Example 8. The water-soluble product contains 5.65% nitrogen.

EXAMPLE 12

A water-soluble product prepared by the method of Example 11 is freed of potassium ions by contact with a cation exchange resin. The resulting solution is stripped of volatile materials by vacuum distillation to obtain a 90% solution of the desired product.

EXAMPLE 13

The procedure of Example 11 is repeated except that the diacetone acrylamide is replaced, on an equimolar basis, by diacetophenone acrylamide. A similar product is obtained.

EXAMPLE 14

Following the procedure of Example 11, a product is prepared from 2,028 parts (12 moles) of diacetone acrylamide, 3,482 parts of methanol, 1964 parts (36 moles of formaldehyde) of the formaldehyde-methanol-water solution, and 360 parts of methanolic potassium hydroxide. The product is neutralized with phosphoric acid to a pH of 6.45 and stripped of volatile materials under vacuum. The neutralized and stripped water-soluble product contains 5.03% nitrogen.

EXAMPLE 15

A mixture of 1,268 parts (7.5 moles) of diacetone acrylamide, 1,635 parts (30 moles of formaldehyde) of the formaldehyde-methanol-water solution of Example 8, and 15.8 parts of a 10% solution of potassium hydroxide in methanol (0.09 mole percent potassium hydroxide based on formaldehyde) is heated at 40°–50°C. for five hours, after which time volatile materials are removed by vacuum distillation. The water-soluble product contains 5.33% nitrogen.

EXAMPLE 16

Following the procedure of Example 4, a water-soluble product is prepared from a mixture having a 1:5 mole ratio of diacetone acrylamide to formaldehyde. The resulting product is stripped of volatile materials by distillation at 50°–55°C./60 torr to obtain a concentrated product containing only 20% water.

Addition Polymers of the Water-Soluble Compositions

The water-soluble compositions of this invention may be reacted under free-radical conditions, either alone or in the presence of other monomers, to form addition polymers containing units derived from said water-soluble compositions as in ordinary vinyl polymerization. The term "polymer", as used herein, includes addition homopolymers, copolymers, terpolymers and other interpolymers. It does not, however, include graft polymers, which are not considered to be part of this invention. Graft polymers involving the water-soluble compositions of this invention are disclosed and claimed in U.S. Pat. No. 3,796,773 and in copending application Ser. No. 310,067, filed Nov. 28, 1972.

Polymers which are similar in structure, if not identical, to those of this invention are disclosed in applications Ser. No. 745,375, filed July 17, 1968, and Ser. No. 817,577, filed Apr. 18, 1969. The disclosures of such polymers in these applications were derived from me.

Polymerization by the free-radical method may be effected in bulk, solution, suspension or emulsion, by contacting the monomer or monomers with a polymerization initiator either in the absence or presence of a diluent at a temperature of about 0°–200°C. Suitable initiators include benzoyl peroxide, tertiary butyl hydroperoxide, acetyl peroxide, hydrogen peroxide, azobisisobutyronitrile, persulfate-bisulfite, persulfate-sodium formaldehyde sulfoxylate, chlorate-sulfite and the like. Depending on the monomer system used, solution, suspension or emulsion polymerization may be effected in such polar solvent systems as water and mixtures of water with alcohols or other hydroxylated organic solvents. Solution polymers may additionally be prepared in solvents (e.g., alcohols and ethers such as tetrahydrofuran, ethylene glycol, diethylene glycol, ethers thereof and the like); also contemplated are non-aqueous suspension polymers in organic solvents and plasticizers.

Suitable emulsifiers for use in the preparation of emulsion polymers of this invention include cationic materials such as stearyl dimethyl benzyl ammonium chloride; non-ionic materials such as alkyl aryl polyether alcohols and sorbitan mono-oleate; anionic materials such as sodium decylbenzene sulfonate, dioctyl sodium sulfosuccinate, sodium salts of alkyl aryl polyether sulfates, and sodium lauryl sulfate; alkali metal salts of lignosulfonic acids, silicic acids and the like; and colloidal materials such as casein, sodium polyacrylate, carboxymethylcellulose, hydroxyethylcellulose, gum tragacanth, sodium alginate, gelatin, methylcellulose, gum arabic, dextrins or polyvinyl alcohol.

A large variety of polymerizable compounds can be used to form interpolymers with the water-soluble compositions of this invention. They include (1) esters of unsaturated alcohols, (2) esters of unsaturated acids, (3) esters of unsaturated polyhydric alcohols, (4) vinyl cyclic compounds, (5) unsaturated ethers, (6) unsaturated ketones, (7) unsaturated amides, (8) unsaturated aliphatic hydrocarbons, (9) vinyl halides, (10) unsaturated acids, (11) unsaturated acid anhydrides, (12) unsaturated acid chlorides, and (13) unsaturated nitriles. Specific illustrations of such compounds are:

1. Unsaturated alcohols and esters thereof: (a) Allyl, methallyl, crotyl, 1-chloroallyl, 2-chloroallyl, cinnamyl, vinyl, methylvinyl, 1-phenallyl, butenyl alcohols, and ester of such alcohols with (b) saturated acids such as acetic, propionic, butyric, valeric, caproic and stearic; (c) unsaturated acids such as acrylic, alpha-substituted acrylic (including alkylacrylic, e.g., methacrylic, ethylacrylic, propylacrylic, etc., and arylacrylic such as phenylacrylic), crotonic, oleic, linoleic and linolenic; (d) polybasic acids such oxalic, malonic, succinic, glutaric, adipic, pimelic, suberic, azelaic and sebacic; (e) unsaturated polybasic acids such as maleic, fumaric, citraconic, mesaconic, itaconic, methylenemalonic, acetylenedicarboxylic and aconitic; (f) aromatic acids, e.g., benzoic, phenylacetic, phthalic, terephthalic and benzoylphthalic acids.

2. Esters of saturated alcohols, such as methyl, ethyl, propyl, isopropyl, butyl, isobutyl, sec-butyl, tert-butyl, 2-ethylhexyl, cyclohexyl or behenyl alcohols, with unsaturated aliphatic monobasic and polybasic acids, examples of which are illustrated above.

3. Esters of unsaturated polyhydric alcohols, e.g., butenediol, with saturated and unsaturated aliphatic and aromatic, monobasic and polybasic acids, illustrative examples of which appear above.

4. Vinyl cyclic compounds including styrene, o-, m-, p-chlorostyrenes, bromostyrenes, fluorostyrenes, methylstyrenes, ethylstyrenes and cyanostyrenes; di-, tri-, and tetra-chlorostyrenes, bromostyrenes, fluorostyrenes, methylstyrenes, ethylstyrenes, cyanostyrenes; vinylnaphthalene, vinylcyclohexane, divinylbenzene, trivinylbenzene, allylbenzene, and heterocycles such as vinylfuran, vinylpyridine, vinylbenzofuran, N-vinylcarbazole, N-vinylpyrrolidone and N-vinyloxazolidone.

5. Unsaturated ethers such as methyl vinyl ether, ethyl vinyl ether, cyclohexyl vinyl ether, octyl vinyl ether, diallyl ether, ethyl methallyl ether and allyl ethyl ether.

6. Unsaturated ketones, e.g., methyl vinyl ketone and ethyl vinyl ketone.

7. Unsaturated amides, such as acrylamide, methacrylamide, N-methylacrylamide, N-phenylacrylamide, N-allylacrylamide, N-methylolacrylamide, N-allylcaprolactam and diacetone acrylamide.

8. Unsaturated aliphatic hydrocarbons, for instance, ethylene, propylene, butenes, butadiene, isoprene, 2-chlorobutadiene and alpha-olefins in general.

9. Vinyl halides, e.g., vinyl fluoride, vinyl chloride, vinyl bromide, vinylidene chloride, vinylidene bromide, allyl chloride and allyl bromide.

10. Unsaturated acids (for example, acrylic, methacrylic, propylacrylic), examples of which appear above.

11. Unsaturated acid anhydrides, e.g., maleic, citraconic, itaconic, cis-4-cyclohexene-1,2-dicarboxylic and bicyclo(2,2,1)-5-heptene-2,3-dicarboxylic anhydrides.

12. Unsaturated acid halides such as cinnamoyl, acrylyl, methacrylyl, crotonyl, oleyl and fumaryl chlorides or bromides.

13. Unsaturated nitriles, e.g., acrylonitrile, methacrylonitrile and other substituted acrylonitriles.

The relative proportions of the monomers to be used in interpolymerization depend upon the reactivity of these monomers as well as the properties desired for the interpolymers being formed. To illustrate, interpolymers in which rigidity is desired are obtained by polymerization of a mixture of monomers having a few substituents or substituents of relatively short chain length. If a still higher degree of rigidity is desired, a monomer mixture may be used in which a small amount of a bifunctional monomer is included such as divinylbenzene which will crosslink the polymer.

Especially preferred, for the purposes of this invention, are solution and emulsion interpolymers and latices of the watersoluble compositions of this invention with one or more of vinyl carboxylates (e.g., vinyl acetate), vinyl aromatic compounds (e.g., styrene) and acrylic monomers (e.g., acrylic and methacrylic acid, alkyl acrylates and methacrylates, acrylonitrile, acrylamides), as well as combinations thereof. These may be prepared by polymerizing the monomer mixture in a suitable vehicle such as water or an organic solvent, optionally in the presence of emulsifiers or surfactants, chain transfer agents, polymerization catalysts and the like. Preferred as suractants for latex formation are sulfate-containing compounds such as alkaryl polyether sulfates.

The preparation of polymers of this invention is illustrated by the following examples.

EXAMPLE 17

To a solution of 53 parts of the product of Example 1 and 20 parts of acrylamide in 432 parts of water is added under nitrogen, with stirring, 0.2 part each of ammonium persulfate and sodium bisulfite and 8.25 parts of mercaptosuccinic acid. The mixture is heated to 67°C. for about 5 hours, with stirring. The product is the desired 10% aqueous solution of a copolymer of acrylamide with the product of Example 1.

EXAMPLE 18

A mixture of 58 grams of the product of Example 5, 335 grams of styrene, 377 grams of ethyl acrylate and 219 grams of ethylene glycol monomethyl ether is purged with nitrogen at room temperature, and 7.125 grams of t-dodecyl mercaptan and 5 grams of cumene hydroperoxide are added. The solution is stirred and 100 ml. thereof is added to a nitrogen-purged solution of 4.125 grams of t-dodecyl mercaptan and 2.28 grams of cumene hydroperoxide in 500 grams of ethylene glycol monomethyl ether. The addition period is 1/2 hour and the latter solution is heated to 108°C. while addition is proceeding. The remainder of the monomer solution is added beginning when the temperature of the reaction flask has reached 108°C. and continuing over a 5-hour period. Heating and stirring are continued as three successive 2.28-gram portions of cumene hydroperoxide are added. When polymerization is complete, the desired terpolymer solution is cooled to room temperature.

EXAMPLE 19

A reaction vessel containing 536 parts of n-butanol is purged with nitrogen and heated to 115°C. with stirring. To the n-butanol is added a mixture of 4 parts of the product of Example 5, 488 parts of ethyl acrylate, 132 parts of methyl methacrylate, 132 parts of styrene, 8 parts of t-dodecyl mercaptan, 8 parts of cumene hydroperoxide and 240 parts of n-butanol. Addition takes place over a 6-hour period, after which two additional portions of cumene hydroperoxide, the first containing 1.2 parts and the second containing 0.6 parts, are added. The desired solution tetrapolymer is cooled to room temperature and 20 parts of xylene is added.

EXAMPLE 20

A mixture of 1985 parts of n-butanol and 350 parts of xylene is purged with nitrogen and heated to reflux, and a mixture of 191 parts of the product of Example 5, 2135 parts of ethyl acrylate, 595 parts of styrene, 595 parts of methyl methacrylate, 70 parts of methacrylic acid, 35 parts of t-dodecyl mercaptan, 35 parts of cumene hydroperoxide and 1139 parts of n-butanol is added over 5 hours. Refluxing is continued as two additional portions of 17 parts each of cumene hydroperoxide are added. The product is the desired interpolymer.

EXAMPLE 21

By a procedure similar to that of Example 20, an interpolymer is prepared from 177 parts of the product of Example 5, 846 parts of styrene, 864 parts of ethyl acrylate, 95 parts of methyl methacrylate and 39 parts of methacrylic acid, in sufficient ethylene glycol monomethyl ether to produce a 50% solution. The polymerization catalyst is cumene hydroperoxide and the chain transfer agent is t-dodecyl mercaptan.

EXAMPLE 22

By a procedure similar to that of Example 20, an interpolymer is prepared from 113 parts of the product of Example 5, 558 parts of styrene, 567 parts of ethyl acrylate and 61 parts of methyl methacrylate in sufficient ethylene glycol monomethyl ether to produce a 50% solution. The polymerization catalyst is cumene hydroperoxide, and the chain transfer agent is t-dodecyl mercaptan.

EXAMPLE 23

Following a procedure similar to that of Example 20, an interpolymer is prepared from 40.2 parts of the product of Example 5, 31 parts of acrylic acid, 194 parts of ethyl acrylate, 194 parts of methyl methacrylate and sufficient isopropanol to produce a 50% solution of the polymer. The polymerization catalyst is azobisisobutyronitrile and the chain transfer agent is t-dodecyl mercaptan.

EXAMPLE 24

Following a procedure similar to that of Example 20, a terpolymer is prepared from 42.5 parts of the product of Example 5, 376 sufficient parts each of styrene and methyl methacrylate, and suficient ethylene glycol monomethyl ether to produce a 50% solution of the polymer. The initiator is cumene hydroperoxide and the chain transfer agent is t-dodecyl mercaptan.

EXAMPLE 25

A mixture of 0.6 part of azobisisobutyronitrile, 4.5 parts of t-dodecyl mercaptan, 450 parts of benzene and 360 parts of ethyl acetate is heated to 75°C. under nitrogen, with stirring, and there is added a mixture of 6 parts of azobisisobutyronitrile, 4.5 parts of t-dodecyl mercaptan, 16 parts of the product of Example 5, 312 parts of butyl acrylate and 579 parts of methyl methacrylate, the addition taking place over 3 hours. There are then added a solution of 1.2 parts of azobisisobutyronitrile in about 40 parts of ethyl acetate; stirring is continued for four hours and there is finally added a solution of 1.2 parts of azobisisobutyronitrile in 45 parts of ethyl acetate. Stirring is again continued for 6 ½ hours, whereupon there is obtained the desired terpolymer solution.

EXAMPLE 26

By a procedure similar to that of Example 20, a tetrapolymer is prepared from 68 parts of the product of Example 5, 370 parts of ethyl acrylate, 327 parts of styrene, 15 parts of methacrylic acid, and sufficient ethylene glycol monomethyl ether to produce a 50% polymer solution. The polymerization initiator is cumene hydroperoxide, and the chain transfer agent is t-dodecyl mercaptan.

EXAMPLE 27

Following substantially the procedure of Example 20, an interpolymer is prepared from 51 parts of the product of Example 7, 22 parts of 2-acrylamido-2-methylpropanesulfonic acid, 180 parts of styrene, 482 parts of ethyl acrylate, and sufficient ethylene glycol monomethyl ether and methanol to produce a 40% polymer solution in a 1:5 mixture of methanol and said ether. The polymerization catalyst is azobisisobutyronitrile; no chain transfer agent is used.

EXAMPLE 28

A tetrapolymer similar to that of Example 27 is prepared from 51 parts of the product of Example 7, 14 parts of 2-acrylamido-2-methylpropanesulfonic acid, 288 parts of styrene and 382 parts of ethyl acrylate. Sufficient ethylene glycol monomethyl ether and methanol are used to prepare a 40% polymer solution in the solvent mixture.

EXAMPLE 29

A tetrapolymer similar to that of Example 27 is prepared from 51 parts of the product of Example 7, 22 parts of 2-acrylamido-2-methylpropanesulfonic acid, 382 parts of ethyl acrylate and 281 parts of methyl methacrylate in sufficient ethylene glycol monomethyl ether and isopropanol to produce an approximately 75% polymer solution.

EXAMPLE 30

A mixture of 0.6 part of azobisisobutyronitrile, 21 parts of t-dodecyl mercaptan, 450 parts of benzene and 90 parts of isopropanol is heated to 75°C. under nitrogen, with stirring, and a a mixture of 6 parts of azobisisobutyronitrile, 7 parts of t-dodecyl mercaptan, 230 parts of isopropanol, 285 parts of butyl acrylate, 525 parts of methyl methacrylate and 130 parts of a product similar to that of Example 7 but containing 69% of the diacetone acrylamide-formaldehyde condensation product is added over three hours. Heating and stirring are continued as two additional portions of 1.2 parts azobisisobutyronitrile in 45 parts of isopropanol are added. The product is a 50% solution of the desired terpolymer.

EXAMPLE 31

Following a procedure similar to that of Example 20, a tetrapolymer is prepared from 437 parts of the product of Example 6, 1540 parts each of styrene and methyl methacrylate, 70 parts of methacrylic acid and sufficient xylene and ethylene glycol monomethyl ether (1:1 mixture) to produce a 50% solution of the polymer. The polymerization catalyst is cumene hydroperoxide and the chain transfer agent is t-dodecyl mercaptan.

EXAMPLE 32

A tetrapolymer similar to that of Example 31 is prepared from 94 parts of the product of Example 6, 146 parts each of styrene and methyl methacrylate and 8 parts of methacrylic acid, in a mixture of ethylene glycol monomethyl ether and xylene as solvent. The initiator is cumene hydroperoxide and the chain transfer agent is t-dodecyl mercaptan. A 50% polymer solution is obtained.

EXAMPLE 33

A tetrapolymer similar to that of Example 31 is prepared from 80 parts of the product of Example 16, 72.5 parts each of styrene and methyl methacrylate, 4.3 parts of methacrylic acid, and sufficient ethylene glycol monomethyl ether to produce a 50% solution. The polymerization initiator is cumene hydroperoxide, and the chain transfer agent is t-dodecyl mercaptan.

EXAMPLE 34

A mixture of 50 parts of 2-acrylamido-2-methylpropanesulfonic acid, 9.95 parts of sodium hydroxide, 300 parts of methanol, 1 part of azobisisobutyronitrile and 58.5 parts of a product similar to that of Example 6 but containing 85.5% of the diacetone acrylamide-formaldehyde condensation product is added dropwise, with stirring, to 200 parts of methanol maintained at 65°C. Two additional portions of azobisisobutyronitrile (0.5 part each) are added as heating and stirring are continued. When polymerization is complete, the methanol is removed by evaporation to yield the desired solid copolymer.

EXAMPLE 35

A mixture of 200 parts of n-butanol and 93 parts of an aromatic solvent boiling at about 165° is heated to 116°C. under nitrogen, with stirring, and there are simultaneously added (a) a solution of 20 parts of the product of Example 5 in 39 parts of n-butanol and (b) a mixture of 104 parts of styrene, 30 parts of ethyl acrylate, 4 parts of cumene hydroperoxide, 4 parts of t-dodecyl mercaptan and 205 parts of an 84% solution of mono-n-butyl maleate in toluene. The addition time is about 5 hours; heating and stirring are continued for about 11 hours as four additional 0.5-part portions of cumene hydroperoxide are added sequentially. The interpolymer is cooled to room temperature and 100 parts of propylene oxide is added in three portions — 50 parts, then 30 part, then 20 part. An exothermic reaction occurs which causes the mixture to heat to reflux temperature. There is obtained the desired tetrapolymer reaction product with propylene oxide.

EXAMPLE 36

A mixture of 291 parts of ethyl acrylate, 16 parts of the product of Example 4, 596 parts of water and 90 parts of a 21% aqueous solution of a sodium alkaryl polyether sulfate anionic emulsifier sold under the trade name "Triton X-301" is purged with nitrogen for 45 minutes, after which a solution of 1.5 parts of ammonium persulfate in 10 parts of water and a solution of 0.3 part of sodium formaldehyde sulfoxylate in 15 parts of water are added. The reaction vessel is cooled as the mixture is stirred and an exothermic reaction takes place which causes the temperature to rise to 59°C. After 10 minutes an additional solution of 0.3 part of sodium formaldehyde sulfoxylate in three parts of water is added and the mixture is filtered, yielding the desired copolymer latex.

EXAMPLE 37

A mixture of 87 grams of diacetone acrylamide, 30 grams of the product of Example 8, 180 grams of butyl acrylate, 3 grams of acrylic acid, 418 grams of water and 34 grams of an anionic emulsifier sold under the trade name "Abex 18S" is purged with nitrogen. To the mixture is added 5 ml. of a 10% aqueous solution of sulfuric acid, 1.0 gram of sodium formaldehyde sulfoxylate and 1.5 grams of ammonium persulfate. The mixture is stirred under nitrogen for about 15 minutes and then heated to 72°C., after which 1 ml. of t-butyl hydroperoxide is added. Heating is continued at about 60°–65°C. for two hours. The desired tetrapolymer latex is then filtered through cheese cloth and neutralized with 10% aqueous ammonia solution.

EXAMPLE 38

Following substantially the procedure of Example 37, a tetrapolymer latex is prepared from 157 parts of diacetone acrylamide, 200 parts of butyl acrylate, 4 parts of acrylic acid, 67 parts of an aqueous composition similar to that of Example 4 except that it contains 60% of the diacetone acrylamide-formaldehyde reaction product and 510 parts of water. Following its preparation, the latex is neutralized with a 10% aqueous ammonia solution.

EXAMPLE 39

Following the procedure of Example 37, tetrapolymer latex is prepared from 30 parts of diacetone acrylamide, 30 parts of the product of Example 10, 120 parts of butyl acrylate, 20 parts of methacrylic acid and 283 parts of water, and is then neutralized with 10% aqueous ammonia solution.

EXAMPLE 40

Following the procedure of Example 37, a terpolymer latex is prepared from 70 parts of the product of Example 9, 110 parts of butyl acrylate, 20 parts of methacrylic acid and 280 parts of water, and is subsequently neutralized with 28% aqueous ammonia solution.

EXAMPLE 41

Following substantially the procedure of Example 37, an interpolymer latex is prepared from 40 parts of diacetone acrylamide, 104 parts of acrylonitrile, 202 parts of butyl acrylate, 16 parts of methacrylic acid, a solution of 40 parts of the product of Example 11 in 40 parts of water, and 520 parts of water, and is subsequently neutralized with 28% aqueous ammonia solution.

EXAMPLE 42

A mixture of 160 parts of water, 2 parts of the product of Example 5, 4.5 parts of a 30% aqueous solution of dihexyl sodium sulfosuccinate, 2.5 parts of sodium lauryl sulfate and 0.3 part of potassium persulfate is charged to a pressure bottle and cooled to freezing. Vinyl chloride, 98 parts, and 0.15 part of sodium formaldehyde sulfoxylate are added and the bottle is sealed and heated with agitation for 7 ½ hours at 60°C. The desired copolymer latex is obtained as the product.

EXAMPLE 43

A pressure bottle is charged with 25 parts of styrene, 70 parts of butadiene, 9.6 parts of the product of Example 5, 200 parts of water, 0.2 part of potassium persulfate, 4 parts of diamyl sodium sulfosuccinate, 0.25 part of a sodium naphthalene sulfonate emulsifier sold under the trade name "Tamol N", 0.5 part of cumene hydroperoxide, 0.5 part of t-dodecyl mercaptan and 0.2 part of sodium formaldehyde sulfoxylate. The bottle is sealed and agitated for 5 hours at 50°C.; it is then opened and 2 parts of an alkylphenyl polyethoxyethanol nonionic emulsifier sold under the trade name "Triton X-405", 7.8 parts of water and 0.2 part of sodium diethyl dithiocarbamate are added. Volatile materials are removed by steam stripping, yielding the desired terpolymer latex.

EXAMPLE 44

Following the procedure of Example 43, a tetrapolymer latex is prepared from 15 parts of styrene, 70 parts of butadiene, 10 parts of diacetone acrylamide, 9.6 parts of the product of Example 5 and 200 parts of water.

EXAMPLE 45

A reaction flask is charged with 500 parts of water, 36 parts of styrene, 36 parts of butyl acrylate, 4 parts of the product of Example 4, 1 part of acrylic acid, 5 parts each of an oxyethylated alkylphenol water-soluble emulsifier sold under the trade name "Igepal CO-710" and a similar oil-soluble emulsifier sold under the trade name "Igepal CO-520", and 2.5 parts of sodium lauryl sulfate. The mixture is purged with nitrogen and stirred as a solution of 0.2 part of ammonium persulfate in 5 parts of water and a solution of 0.2 part of sodium formaldehyde sulfoxylate in 5 parts of water are added. Stirring is continued as the mixture is heated to 68°C., and there are simultaneously added (1) a mixture of 410 parts of water, 286 parts of styrene, 286 parts of butyl acrylate, 36 parts of the product of Example 4,6 parts of acrylic acid, 5 parts each of 'Igepal CO-710' and Igepal CO-520, and 1 part of sodium lauryl sulfate; (2) a solution of 1.4 parts of ammonium persulfate in 50 parts of water; and (3) a solution of 1.4 parts of sodium formaldehyde sulfoxylate in 50 parts of water. The addition takes place over 1 hour at 68°–72°C. Stirring is continued at 72°–80°C. as additional portions of ammonium persulfate and sodium formaldehyde sulfoxylate are added, followed by portions of t-butyl hydroperoxide and sodium formaldehyde sulfoxylate. The mixture is cooled to room temperature and filtered through cheesecloth, a solution of Igepal CO-710 in 25 parts of water and a solution of Triton X-405 in 7 parts of water are added, and the material is stirred briefly. The product is the desired tetrapolymer latex.

EXAMPLE 46

Following a procedure similar to that of Example 45, a tetrapolymer latex is prepared from 135 parts of the product of Example 5, 822 parts of ethyl acrylate, 570 parts of methyl methacrylate and 27 parts of acrylic acid. The latex is obtained as a 45% suspension in water. The emulsifiers are dioctyl sodium sulfosuccinate (sold under the trade name "Aerosol OT") and Triton X-405. Following its preparation, the latex is neutralized by the addition of 28% aqueous ammonia solution.

EXAMPLE 47

Following the procedure of Example 45, a terpolymer is prepared from 62 parts of the product of Example 5, 372 parts of diacetone acrylamide and 270 parts of butyl acrylate. It is obtained as a 43% aqueous latex.

EXAMPLE 48

A tetrapolymer latex is prepared by the method of Example 45, containing 4.1 parts of the product of Example 4, 63.8 parts of butyl acrylate, 31.1 parts of acrylonitrile and 1 part of acrylic acid. The emulsifiers are Triton X-301 and Triton X-405.

EXAMPLE 49

Following the procedure of Example 45, an interpolymer latex is prepared containing 5.8 parts of the product of Example 4, 68 parts of ethyl acrylate, 14.5 parts of butyl acrylate, 10.7 parts of acrylonitrile and 1.0 part of acrylic acid. the emulsifiers are Triton X-301 and Triton X-405. Following its preparation, the latex is neutralized with aqueous ammonia solution.

EXAMPLE 50

Following the procedure of Example 45, a copolymer latex is prepared containing 3 parts of the composition of Example 5 and 97 parts of vinyl acetate. It is obtained as a 50% aqueous latex.

EXAMPLE 51

A reaction vessel is charged with 1000 parts of water, 60 parts of "Abex VA-50", 2 parts of soduim acetate, 164 parts of vinyl acetate, 30 parts of 2-ethylhexyl acrylate and 4 parts of potassium persulfate. The mixture is heated to 70°C. and there are simultaneously added (1) a mixture of 65 parts of vinyl acetate and -ethylhexyl 12 parts of 2-ethylhxyl acrylate, followed by a mixture of 200 parts of water, 50 parts of Abex VA-50, 591 parts of vinyl acetate, 108 parts of 2-ethylhexyl acrylate and 67 parts of the product of Example 12; (2) 100 parts of a 2% aqueous solution of sodium formaldehyde sulfoxylate; and (3) a solution of 1 part of ammonium persulfate in 10 parts of water. Heating is continued at 70°–80°C., with agitation, until polymerization is complete. The product is then filtered through cheese-cloth, yielding the desired terpolymer latex.

EXAMPLE 52

A solution of 77 parts of vinyl acetate, 20 parts of butyl acrylate, 5.4 parts of the product of Example 4, 0.75 part of hydroxyethylcellulose, 15 parts of Triton X-405, 10 parts of sodium lauryl sulfate and 1.5 part of sodium bicarbonate in 700 parts of water is purged with nitrogen, and 0.4 part each of sodium formaldehyde sulfoxylate and ammonium persulfate, each dissolved in 10 parts of water, are added. The solution is heated to 72°C. and there are simultaneously added, over three hours, (1) a mixture of 1078 parts of vinyl acetate, 280 parts of butyl acrylate, 76.4 parts of the product of Example 4, 15 parts of Triton X-405, 5 parts of sodium lauryl sulfate, 875 parts of water and about 3 parts of t-butyl hydroperoxide, this solution being added via a subsurface addition tube; (2) a solution of 2.8 parts of ammonium persulfate in 50 parts of water; and (3) a solution of 2.8 parts sodium formaldehyde sulfoxylate in 50 parts of water. The mixture is maintained at 70°–75°C. for one-half hour after the addition of the above described solutions is complete, and is then cooled and filtered. The product is the desired terpolymer latex.

EXAMPLE 53

Following the procedure of Example 45, a 50% aqueous tetrapolymer latex is prepared from 225 parts of vinyl acetate, 975 parts of butyl acrylate, 150 parts of acrylonitrile and 150 parts of the product of Example 14. The emulsifiers are Aerosol OT and Triton X-405.

EXAMPLE 54

A mixture of 72 grams of vinyl acetate, 25 grams of dibutyl maleate, 3 grams of the product of Example 5, 0.95 gram of hydroxyethylcellulose, 25 grams of Triton X-301, 40 grams of Triton X-405 and 1.5 grams of sodium acetate in 700 grams of distilled water is purged with nitrogen, and solutions of 0.4 gram each of ammonium persulfate and sodium formaldehyde sulfoxylate in 10 grams of water are added. The mixture is heated to 75°C., with stirring, and there are added simultaneously, over one-half hour, (1) a mixture of 1009 grams of vinyl acetate, 350 grams of dibutyl maleate, 72 grams of the product of Example 5, 125 grams of Triton X-301, 20 grams of Triton X-405, 875 grams of water and 3 ml. of t-butyl hydroperoxide; (2) a solution of 2.8 grams of ammonium persulfate in 50 grams of water; and (3) a solution of 2.8 grams of sodium formaldehyde sulfoxylate in 50 grams of water. The mixture is stirred for one-half hour, cooled to room temperature and filtered through cheesecloth to yield the desired terpolymer emulsion.

The addition polymers of this invention have thermosetting properties which make them useful in many fields, chiefly in adhesives and coatings. They may be cured at about 25°C. or above to form thermoset resins which are durable and resistant to weathering, corrosion and the like. Curing is frequently enhanced by the addition of an aminoplast composition as a crosslinking agent. As used herein, the term "aminoplast composition" means a thermosetting amine-aldehyde or amide-aldehyde condensation product, which may be monomeric or polymeric. Exemplary of the aminoplast compositions that may be employed in this way are the urea formaldehydes, e.g., propylene urea formaldehyde or dimethylol urea formaldehyde; melamine formaldehydes, e.g., tetramethylolmelamine, pentamethylolmelamine or hexamethylolmelamine; ethylene ureas, e.g., dimethylol ethylene urea, dihydroxydimethylol ethylene urea, ethylene urea formaldehyde or hydroxyethylene urea formaldehyde; carbamates, e.g., alkyl carbamate formaldehydes; formaldehyde-acrolein condensation products; formaldehyde-acetone condensation products; alkylolamides, e.g., N-methylolformamide, N-methylolacetamide, N-methylolacrylamide, N-methylolmethacrylamide, N-methylol-N-methylacrylamide, N-methylolmethylene-bis(acrylamide) or methylene-bis(N-methylolacrylamide); haloethyleneacrylamide; diureas, e.g., trimethylol acetylene diurea, tetramethylol acetylene diurea; triazones, e.g., dimethylol-N-ethyl triazone, N,N'-ethylene-bis(dimethylol)triazone and halo triazones; haloacetamides, e.g., N-methylol-N-methylchloroacetamide; urons, e.g., dimethylol uron or dihydroxy dimethylol uron; and the like. Also useful are derivatives of the above compounds wherein the methylol or other hydroxyalkyl groups therein are replaced by lower alkoxyalkyl groups (e.g., hexamethoxymethylmelamine), as well as analogous thioureas, thioamides and the like.

Coatings may be prepared directly from the water-soluble compositions of this invention by polymerization on a surface, usually in a suitable vehicle which may be a solvent or a dispersing agent for the water-soluble compositions and/or polymers obtained therefrom. For example, the product of Example 15 is mixed with 1% of its weight of t-butyl perbenzoate and coated on a plywood panel. The panel is baked for one-half hour at 120°C., during which time the coating impregnates the surface and gels to form a protective film. Similarly, a mixture of 35 parts of the product of Example 15, 9 parts of water and 0.5 parts of t-butyl perbenzoate can be baked on a plywood surface to form a protective film.

Many of the latices of this invention (e.g., the products of Examples 38 and 47) may be used to form clear, protective coatings on plywood or concrete.

The water-soluble compositions of this invention may be used as crosslinking agents for unsaturated polyesters, especially for the formation of "prepregs" containing inert reinforcing media such as paper, glass fiber and the like. For this purpose, it is generally preferred to use concentrated systems such as those of Examples 6 and 16. The resulting prepregs may be used to form laminates which can be cured to hard, resistant objects.

Pigmented Polymer Compositions

Compositions suitable for use as coatings, paints and the like may be obtained by combining the polymers of this invention with pigments. For this purpose, the polymer may be used as a dispersion such as a latex, as a solution, or as a solid. The weight ratio of pigment to polymer in the composition is generally between about 1:20 and 20:1.

Pigmented latex compositions are particularly useful as paints for wood, metal and concrete surfaces and are characterized by excellent wet adhesion and blister resistance under conditions of high humidity and moisture. Particularly useful polymers for this purpose are the interpolymers containing units derived from the water-soluble compositions of this invention in combination with other units derived from monomers which have achieved commercial acceptace as precursors for paint vehicles. Examples of suitable interpolymers include those of the water-soluble compositions of this invention with isoprene, isobutene-isoprene mixtures, vinylidene chloride-acrylonitrile mixtures, vinyl acetate, chloroprene-acrylonitrile mixtures, neoprene, butadiene-acrylonitrile mixtures, styrene-butadiene-acrylic acid mixtures, styrene-butadiene-vinylpyridine mixtures, and various other mixtures containing alkyl methacrylates and/or alkyl acrylates, optionally in the presence of styrene or a similar vinyl aromatic compound. The preferred interpolymers are derived from the water-soluble compositions of this invention in combination with vinyl acetate, alkyl acrylates, alkyl methacrylates and styrene.

Pigments used in interior and exterior house paints usually comprise hiding white pigments, other tints and colors ordinarily being obtained by mixing other colored paint pigments with the white pigments. Any of the inorganic and organic pigments, pigment lakes, insoluble dyes and other durable coloring matter ordinarily used in formulating durable exterior paints, varnishes, enamels and lacquers can be used in the pigmented compositions of this invention. Typical useful white hiding pigments are rutile titanium dioxide, anatase titanium dioxide, zinc oxide, leaded zinc oxide, zinc sulfide, lead titanate, antimony oxide, zirconium oxide, white lead, basic lead silicate, lithopone, titanated lithopone, titanium-barium pigment, titanium-calcium pigment and titanium-magnesium pigment. The titanium dioxide pigments ordinarily are preferred.

While the pigmentation can be solely of hiding prime pigments, it is economically impractical to use solely prime pigments at high pigment volume concentrations. As is ordinary practice in paint formulations, total pigments usually consist of hiding prime pigments extended with well-known pigment extenders such as calcium carbonate, gilders whiting talc, barytes, magnesium silicate, aluminum silicates, diatomaceous earth, china clay, Asbestine, silica or mica. The relative proportions of the prime white pigment and the pigment extender may be varied widely, but usually the hiding prime pigment is present at a pigment volume concentration which provides the desired paint covering power or hiding and the extender pigment is present in an amount which provides the paint with the desired total pigment volume concentration. Prime pigments and extender pigments range widely in density, but ordinarily white house paints and light tints thereof have a pigment composition whereof the extender pigment is present in the weight proportion of 0.4–4.0 parts per part of hiding prime pigment. In addition to the white pigments and extenders mentioned above, colored pigments may be used. Examples of these are iron oxide, chrome oxide, chrome yellow, toluidene red, hansa yellow, phthalocyanine blues and greens, red lead and zinc chromate.

The pigments can be dispersed in the latex by any of the well-known techniques of pigment dispersion in paint formulation, such as roller milling, ball or pebble grinding, sand grinding, paddle-mixer dispersion techniques, Werner-Pfleiderer "dough" mixer mixing and other pigment paste techniques. The pigment composition is preferably dispersed in the presence of a water-soluble and swellable colloidal bodying agent and an auxiliary surfactant in addition to the surfactants present in the respective latices to stabilize the polymer dispersion. The auxiliary surfactant for dispersing the pigment composition can be non-ionic, anionic or cationic, preferably of the water-soluble type. Ordinarily a concentration of up to 2% of the auxiliary surfactant, based on the weight of the pigment composition, is adequate, the preferred concentration being 0.1–1.0% on the indicated basis. The rheological characteristics of the paint can be varied to suit the application needs by various means known in the art, such as variations in degree of neutralization of acid moieties in the polymer or by the addition of thickening agents such as polyacrylates, water-soluble cellulose derivatives, casein, starch, locust bean gum, bentonite, sodium silicate, karaya gum, alginates and the like. Other additives which may be incorporated in the pigmented latex compositions are anti-freeze agents; humectants; dispersants, surfactants and sequestering agents such as tetrapotassium pyrophosphate, trisodium phosphate, ethanolamines, sodium hydroxide, potassium hydroxide, methylamine, dimethylamine, morpholine, ammonium hydroxide or any of the various non-ionic, anionic and cationic surfactants known in the art; fungicides and bactericides such as ammonia, formaldehyde, sodium pentachlorophenoxide, sodium o-phenylphenoxide, p-dichloro-m-cresol and phenylmercuric acetate; anti-foam agents such as fatty acids, pine oil, vegetable oils, casein wax, heavy metal stearates, cetyl alcohol, lauryl alcohol and various silicones; anti-oxidants such as alkylated and styrenated phenols, phosphites, phenyl-$\beta$-naphthylamine and acetone-aniline condensation products; tackifiers such as hydrogenated rosin, ester gum, coumarone resins and low molecular weight polybutenes; softeners and plasticizers such as hydrocarbon oils, dioctyl phthalate and dibutyl sebacate; stiffeners such as high melting point coumarone resins, rosin esters, and thermosetting resins such as the phenol-formaldehyde resins and the aminoplast resins enumerated hereinabove; perfumes such as pine oil, camphor and oil of wintergreen; and corrosion inhibitors.

The pigmented latices described above are applied to the surface being coated by any of the known methods such as brushing, roller coating and the like. They may then simply be dried at room temperature or whatever exterior temperature may prevail at the time, reliance for development of cure being placed upon aging for an extended period of time. On the other hand, the cure of such films may be hastened by drying at elevated temperatures, typically by heating to a temperature no higher than about 200°C. for several minutes to one-half hour, optionally after drying at room temperature.

Typical latex paint formulations containing the latices of this invention are listed in Table I. The identity of certain ingredients is given by trade name, as indicated by quotation marks; these ingredients are well known in the art and readily available under the indicated trade names.

TABLE I

| | Parts by weight Paint A (flat) | Paint B (semi-gloss) |
|---|---|---|
| Mill paste: | | |
| Water | 83.4 | 83.7 |
| "Tamol 731-25" (anionic surfactant) | 5.33 | 10.7 |
| "Triton CF-10" (non-ionic surfactant) | 1.25 | 2.5 |
| "Nopco NDW" (anti-foam agent) | 0.5 | 2.0 |
| Ethylene glycol | 12.5 | 25.0 |
| "Nuodex Super Ad-It" (fungicide) | 0.9 | 1.8 |
| Hydroxyethylcellulose (2.5% aqueous soln.) | 47.5 | 95.0 |
| Rutile TiO$_2$ | 120.0 | 250.0 |
| Anatase TiO$_2$ | 5.0 | — |

In Table II are listed typical pigmented compositions containing the solution polymers of this invention.

TABLE II

|  | Parts by weight | | |
|---|---|---|---|
|  | Paint C (automotive) | Paint D (appliance) | Paint E (coil coating) |
| Mill paste: | | | |
| Product of Example 20 | — | — | 338 |
| Product of Example 26 | — | 338 | — |
| Product of Example 31 | 30 | — | — |
| Toluene | — | 79.5 | — |
| Aromatic solvent b.p. about 150°C. | — | — | 79.5 |
| Red iron oxide | 3 | — | — |
| Yellow iron oxide | 3 | — | 30 |
| Black iron oxide | 3 | — | — |
| Chrome oxide | — | — | 30 |
| Rutile titanium dioxide | — | 126 | 72 |
| Zinc oxide | — | 7 | — |
| Let-down: | | | |
| Product of Example 31 | 432 | — | — |
| "Uformite MM-47" melamine-formaldehyde resin | 165 | — | — |
| Hexamethoxymethylmelamine | — | 8.4 | 8.4 |
| Xylene | 45 | — | — |
| Toluene | — | * | — |
| Aromatic solvent, b.p. about 150°C. | — | * | * |
| Aluminum paste | 10 | — | — |

*Sufficient to provide desired viscosity (3:1 weight ratio toluene to aromatic solvent in Paint D).

TABLE I-continued

|  | Parts by weight | |
|---|---|---|
|  | Paint A (flat) | Paint B (semi-gloss) |
| Asbestine | 60.0 | — |
| Soybean oil | 56.2 | — |
| Pine oil | — | 7.0 |
| Ammonia (28% aqueous soln.) | — | 2.0 |
| Let-down: | | |
| Product of Example 49 | — | 458.6 |
| Product of Example 52 | 230.0 | — |
| "Nopco NDW" | 0.5 | — |
| Pine oil | 3.5 | — |
| Ammonia (28% aqueous soln.) | 1.0 | — |

Pigmented compositions may also be prepared from the solution polymers of this invention; such compositions are particularly useful for forming coatings on metal surfaces and may be used for example, as automotive, appliance and coil coating paints.

As opposed to latex paints which are ordinarily dried at room temperature, paints for coating metal surfaces are usually baked on the surface to form a hard, resistant thermoset coating. Metal coating paints containing the pigmented compositions made from the polymers of this invention may be cured at temperatures of about 150°–300°C. It is preferred to add an aminoplast composition such as those enumerated hereinabove as a crosslinking agent, usually in an amount of about 1–10% based on the resin solids in the composition.

Usually, the only ingredients necessary in pigmented compositions prepared from the solution polymers of this invention are the solvent, polymer, aminoplast and pigment. The pigment may be chosen from those listed above and others known in the art. The solvent is usually an inert one such as an aromatic hydrocarbon, ether, alcohol or the like with a boiling point of about 75°–200°C., or a mixture of such solvents. The solvent content can be varied over a wide range to provide the desired viscosity. Other ingredients described above as useful in latex compositions normally are not required in compositions as described herein suitable for metal coating.

Pigmented compositions may also be prepared from solid polymers of this invention. These compositions may be obtained by removing the solvent or continuous phase from a solution polymer or latex, preferably at relatively low temperatures (e.g., by spray drying) so as to avoid thermosetting, and then blending with the pigments. Alternatively, a pigmented solution polymer or latex may be dried (e.g., by spray drying). The resulting pigmented solid polymers are useful as powder coatings for electrostatic application to metal surfaces. The polymers of Examples 21 and 22, for example, may be precipitated, dried and combined with titanium dioxide for electrostatic application followed by baking for about 20 minutes at 175°C. to form a fused protective coating. Preferably, the powdered coating composition also contains an aminoplast composition such as those described hereinabove. An exemplary formulation contains 72 parts by weight of the dried polymer of Example 21 or 22, 8 parts of "Uformite MM-55", and 20 parts of titanium dioxide.

The pigmented compositions described hereinabove are not themselves part of this invention. They are disclosed and claimed in copending application Ser. No. 312,993, filed Dec. 7, 1972.

ADHESIVES

The addition polymers of this invention, particularly latices thereof, have self-crosslinking properties which make them particularly useful as adhesives. Because of these self-crosslinking properties, the polymers may be cured under acidic (preferably) or alkaline conditions at temperatures from room temperature to about 200°C. to form adherent films with a high percentage of acetone insolubles. Such polymers are especially useful as laminating adhesives and binders for textiles and non-woven fabrics.

It is possible to formulate an adhesive in which the only ingredient present in substantial amounts is the polymer latex of this invention, with the optional presence of such substances as thickeners, anti-foam agents, protective colloids, pigments and the like which are known in the art. Particularly useful for this purpose are polymers containing units derived from an acidic compound such as acrylic acid. For example, the polymer of Example 37, 39 or 40 may be combined with a 5% aqueous hydroxyethylcellulose solution (as a protective colloid) in an amount to provide 4.5 parts of hydroxyethylcellulose per 100 parts of polymer to form a composition suitable for use as an adhesive. However, such adhesives ordinarily cure only at undesirably high temperatures, frequently above 150°C. The preferred adhesive compositions additionally contain at least one substance selected from the group consisting of alkaline reagents (e.g., sodium hydroxide, potassium hydroxide) and the aminoplast compositions previously described herein. Both of these substances may be present, but it is usually satisfactory to use only one in an amount of about 0.5–10.0 parts per 100 parts of the polymer of this invention. It is particularly preferred to use hexamethoxymethylmelamine.

Typical adhesive compositions containing the addition polymers of this invention are listed in Table III.

TABLE III

|  | Parts by weight | | | | |
|---|---|---|---|---|---|
|  | Adhesive F | Adhesive G | Adhesive H | Adhesive J | Adhesive K |
| Product of Example 36 | — | — | — | 100 | — |
| Product of Example 48[1] | 100 | 100 | — | — | — |
| Product of Example 49 | — | — | — | — | 100 |
| Product of Example 52 | — | — | 100 | — | — |
| Hexamethoxy-methylmelamine | — | 3.4[3] | 2.3[4] | 2.3[4] | 3.6[4] |
| Potassium hydroxide[2] | 1.5 | — | — | — | — |
| Vinyl acetate co-polymer thickener | 8 | 8.5 | — | — | — |

[1]Neutralized with aqueous ammonia solution.
[2]Added as a 10% aqueous solution.
[3]Added as a 50% solution in a 2:3 ethanol-water mixture.
[4]Added as a 30% aqueous solution containing 30% of a non-ionic emulsifier.

The above-described adhesive compositions comprising an aminoplast composition or an alkaline reagent in combination with a polymer according to this invention are not part of the present invention but are disclosed and claimed in copending applications Ser. Nos. 313,216 (now U.S. Pat. No. 3,879,325) and 313,217, both filed Dec. 8, 1972.

What is claimed is:

1. A water-soluble composition consisting essentially of:
   A. compounds of the formula

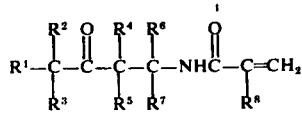

wherein each of $R^1$, $R^2$, $R^3$, $R^4$ and $R^5$ is hydrogen, a hydrocarbon or substituted hydrocarbon radical, a hydroxyalkyl radical having not more than 4 carbon atoms, or an alkoxy derivative of said hydroxyalkyl radical, at least one of $R^1$, $R^2$, $R^3$, $R^4$ and $R^5$ being a hydroxyalkyl radical or alkoxy derivative thereof; each of $R^6$ and $R^7$ is hydrogen or a hydrocarbon or substituted hydrocarbon radical; and $R^8$ is hydrogen, halogen or a lower alkyl radical; with the proviso that the substituents on said substituted radicals do not alter significantly the character or reactivity of said radicals; and B. condensation dimers and trimers of said compounds.

2. A water-soluble composition according to claim 1 which additionally contains, as a diluent, a compound of the formula

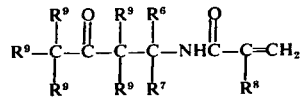

wherein each $R^9$ is individually hydrogen or a hydrocarbon or substituted hydrocarbon radical, at least one such $R^9$ being hydrogen; each of $R^6$ and $R^7$ is hydrogen or a hydrocarbon or substituted hydrocarbon radical; and $R^8$ is hydrogen, halogen or a lower alkyl or substituted lower alkyl radical, said diluent comprising no more than 50% of said composition.

3. A composition according to claim 1 wherein the hydroxyalkyl radicals are hydroxymethyl radicals and the alkoxy derivatives thereof are lower alkoxy derivatives.

4. A composition according to claim 3 wherein $R^6$ and $R^7$ are lower alkyl radicals and $R^8$ is hydrogen or methyl.

5. A composition according to claim 4 wherein from 1 to 3 of $R^1$, $R^2$, $R^3$, $R^4$ and $R^5$ are hydroxymethyl radicals, the remainder thereof being hydrogen.

6. A composition according to claim 5 wherein $R^6$ and $R^7$ are methyl radicals and $R^8$ is hydrogen.

7. A composition according to claim 6 which additionally contains, as a diluent, up to 20% of diacetone acrylamide.

8. An addition polymer of the composition of claim 1.

9. An addition polymer of the composition of claim 5.

10. An addition polymer of the composition of claim 6.

11. An addition polymer of the composition of claim 7.

12. An addition interpolymer of the composition of claim 1 with at least one polymerizable unsaturated monomer.

13. An addition interpolymer of the composition of claim 5 with at least one polymerizable unsaturated monomer.

14. An addition interpolymer of the composition of claim 6 with at least one polymerizable unsaturated monomer.

15. An addition interpolymer of the composition of claim 7 with at least one polymerizable unsaturated monomer.

16. A method for the preparation of a water-soluble composition of matter which comprises reacting at a temperature below about 100°C., while incrementally adding an alkaline reagent, an aliphatic aldehyde containing not more than about 4 carbon atoms, or a reversible polymer thereof, with a substituted acrylamide of the formula

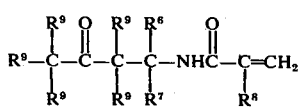

wherein each $R^9$ is individually hydrogen or a hydrocarbon or substituted hydrocarbon radical, at least one such $R^9$ being hydrogen; each of $R^6$ and $R^7$ is hydrogen or a hydrocarbon or substituted hydrocarbon radical; and $R^8$ is hydrogen, halogen or a lower alkyl or substituted lower alkyl radical; with the proviso that the substituents on said substituted radicals do not alter significantly the character or reactivity of said radicals; said reaction being effected in a diluent comprising (1) water, or (2) an organic liquid which is a solvent for the reactants or the product or both, or (3) a mixture of diluents 1 and 2; the molar ratio of said aldehyde to said substituted acrylamide being between about 1:1 and 8:1, and the amount of said alkaline reagent being not more than 1.5 mole percent of the aldehyde used.

17. A method according to claim 16 wherein the aldehyde is formaldehyde or a reversible polymer thereof.

18. A method according to claim 17 wherein $R^6$ and $R^7$ are lower alkyl radicals and R8 is hydrogen or methyl.

19. A method according to claim 18 wherein the diluent comprises water or a mixture of water with a lower alkanol.

20. A method according to claim 19 wherein all of the $R^9$ radicals are hydrogen atoms.

21. A method according to claim 20 wherein the substituted acrylamide is diacetone acrylamide.

* * * * *